US012697761B2

(12) United States Patent
Skovbjerg et al.

(10) Patent No.: US 12,697,761 B2
(45) Date of Patent: Aug. 4, 2026

(54) MOLD INSERT WITH CONDUITS FOR COOLING INJECTION MOLDED ITEM

(71) Applicant: LEGO A/S, Billund (DK)

(72) Inventors: Bo Skovbjerg, Billund (DK); Mads Diemer, Billund (DK)

(73) Assignee: LEGO A/S

( * ) Notice: Subject to any disclaimer, the term of this patent is extended or adjusted under 35 U.S.C. 154(b) by 261 days.

(21) Appl. No.: 18/294,505

(22) PCT Filed: Aug. 2, 2022

(86) PCT No.: PCT/EP2022/071669
§ 371 (c)(1),
(2) Date: Feb. 1, 2024

(87) PCT Pub. No.: WO2023/012150
PCT Pub. Date: Feb. 9, 2023

(65) Prior Publication Data
US 2024/0342971 A1 Oct. 17, 2024

(30) Foreign Application Priority Data

Aug. 2, 2021 (DK) .................................. 202170395

(51) Int. Cl.
*B29C 45/72* (2006.01)
*B29C 45/17* (2006.01)
(Continued)

(52) U.S. Cl.
CPC ...... *B29C 45/7207* (2013.01); *B29C 45/2675* (2013.01); *B29C 2045/7387* (2013.01)

(58) Field of Classification Search
CPC ..... B29C 45/73; B29C 33/02; B29C 45/2642; B29C 45/7312; B29C 2033/023;
(Continued)

(56) References Cited

U.S. PATENT DOCUMENTS 4,976,900 A * 12/1990 Tsutsumi ................ B29C 45/72
264/328.14
2011/0045120 A1 2/2011 Higashi et al.
(Continued)

FOREIGN PATENT DOCUMENTS

CN 105500655 A 4/2016
CN 207643508 U 7/2018
(Continued)

OTHER PUBLICATIONS

JP Office Action corresponding to Application No. 2022-533529, dated Sep. 10, 2024, 5 pages (Machine Translation).
(Continued)

*Primary Examiner* — Armand Melendez
(74) *Attorney, Agent, or Firm* — Day Pitney LLP; George Chaclas; Anthony A. Kassas

(57) ABSTRACT

A mold insert having a main body including a first surface and an opposed second surface, the first surface defining a plane. The mold insert also has a mold core extending from the first surface and a gas inlet port connectable to a supply of pressurized gas. Further, the mold insert has two or more gas outlet ports arranged to direct a gas flow towards an uncovered surface of an injection molded item located on the mold core, after the mold core and the mold cavity are separated from each other. Further, the mold insert has a gas conduit system extending inside the main body connecting the two or more gas outlet ports with the gas inlet port. Each of the two or more gas outlet ports are arranged through the first surface. The gas conduit system is provided in the main body below the first surface.

15 Claims, 8 Drawing Sheets

(51) Int. Cl.
  B29C 45/26      (2006.01)
  B29C 45/73      (2006.01)

(58) Field of Classification Search
  CPC . B29C 2035/0211; H05B 3/283; H05B 3/286;
                  H05B 3/30; H05B 3/32
  USPC .......... 425/547, 406, 470, 182, 181; 249/79,
                  249/114.1, 111, 134, 182
  See application file for complete search history.

(56)                References Cited

U.S. PATENT DOCUMENTS

| | | | | |
|---|---|---|---|---|
| 2016/0107357 | A1* | 4/2016 | Lin | ......................... B29C 33/02 |
| | | | | 425/162 |
| 2016/0170357 | A1 | 6/2016 | Saito et al. | |
| 2018/0370107 | A1 | 12/2018 | Revol | |

FOREIGN PATENT DOCUMENTS

| | | | |
|---|---|---|---|
| EP | 2684663 | A2 | 1/2014 |
| JP | S5569432 | A2 | 5/1980 |
| JP | S63299913 | A2 | 12/1988 |
| JP | H03256707 | A2 | 11/1991 |
| JP | H1058491 | A | 3/1998 |
| JP | 2002192561 | A | 7/2002 |
| JP | 2010111014 | A | 5/2010 |
| JP | 2013193396 | A | 9/2013 |
| WO | 2018222475 | A1 | 12/2018 |
| WO | 2019166492 | A1 | 9/2019 |

OTHER PUBLICATIONS

CN First Office Action corresponding to Application No. 202280048977. 3, dated Mar. 26, 2026, 7 pages (with Translation).

International Search Report and Written Opinion corresponding to Application No. PCT/EP2022/071669, dated Nov. 24, 2022, 12 pages.

Sachs, E., et al., "Production of Injection Molding Tooling With Conformal Cooling Channels Using The Three Dimensional Printing Process", Polymer Engineering and Science, Brookfield Center, US, vol. 40, No. 5, May 1, 2000, pp. 1231-1247.

Anonymous, "PolyJet For Injection Molding", Feb. 24, 2016, pp. 1-19, XP055659218, https://www.alphacam.ch/fileadmin/user_upload/Applikationen/PDFs/Technical_Application_Guide_-_Injection_Molding_-_PolyJet_For_Injection_Molding_-_English_A4_Web.pdf.

Drummer Dietmar, "Lehrstuhl Für Kunststofftechnik Prüf-und Probekörperwerkzeuge am Lehrstuhl für Kunststofftechnik", Apr. 9, 2015, pp. 1-35, https://www.lkt.tf.fau.de/files/2017/06/Probekoerperwerkzeuge.pdf.

DK Office Action corresponding to Application No. PA 2021 70395, dated Jan. 13, 2022, 8 pages.

International Preliminary Report on Patentability corresponding to Application No. PCT/EP2022/071669, dated Jul. 11, 2023, 15 pages.

* cited by examiner

SECTION A-A

DETAIL B

MOLD INSERT WITH CONDUITS FOR COOLING INJECTION MOLDED ITEM

CROSS-REFERENCE TO RELATED APPLICATIONS

The present application is a U.S. National Stage Application of International Application No. PCT/EP2022/071699, filed on Aug. 2, 2022 and published on Feb. 9, 2023 as WO 2023/012150 A1, which claims the benefit and priority of Danish patent Application No. 202170395, filed on Aug. 2, 2021, each of which is incorporated herein by reference in its entirety for any purpose whatsoever.

TECHNICAL FIELD

The present disclosure relates to a mold insert with a mold core, the mold insert being configured for inserting into a mold plate of a mold box of an injection molding machine, and for cooperating with a second mold insert with a mold cavity. The mold insert with the mold core comprises gas conduits for leading gas under pressure from a source of pressurized gas through the mold insert and blow the gas onto a free outer surface of an injection molded item formed on the mold core, when the mold insert with the mold core and the mold insert with the mold cavity have been parted.

BACKGROUND

U.S. Patent Publication No. 2016/0107357 A1 discloses a mold for injection molding, the mold having an air cooling system for cooling injection molded item after the mold halves/parts are separated from each other, following the injection molding step. U.S. 2016/0107357 A1 further teaches air passages configured for directing an air flow towards the molded item, after the mold parts have been separated from each other. Air can be blown onto the molded item via four air passages and an "air providing part" formed as linear conduits having apertures directed toward the item on the mold core, the linear conduits and the apertures formed in a structure raised from an inner surface of the core mold part and surrounding the core. In order to target all sides, of the injection molded item, four separate conduits are needed each formed in a raised sidewall surrounding the core. In order to provide sufficient cooling of the injection molded item, U.S. 2016/0107357 A1 thus teaches a very complex structure of the core part and the cavity part of the mold. Further, the cooling air conduits take up a lot of space in the mold part, which prevents—or at least impedes—arrangement of other necessary or desired structures, such as vent channels, mold cooling channels, ejector pins, alignment posts, etc.

Therefore, there is at least a need for a mold or at least a mold insert for a mold box, which has a simpler structure.

It is one object of the disclosure to provide a mold or at least a mold insert for a mold box, which has more simple structure, than the prior art.

SUMMARY OF THE DISCLOSURE

In a first aspect, the objects of the disclosure are achieved by a mold insert part for injection molding, the mold insert part comprising a main body having a first surface and an opposed second surface, the first surface defining a plane;
a mold core extending from the first surface of the main body of the mold insert part;

a gas inlet port connectable to a supply of pressurized gas;
two or more gas outlet ports arranged to direct a gas flow towards an uncovered surface of an injection molded item located on the mold core, after the mold core and the mold cavity have been separated from each other; and
a gas conduit system extending inside the main body of the mold insert part, and connecting the two or more gas outlet ports with the gas inlet port, common to the two or more gas outlet ports,
wherein each of the two or more gas outlet ports are arranged at least partially through the first surface, and
wherein the gas conduit system is provided in below said first surface.

In an embodiment, at least two of the two or more gas outlet ports are arranged on opposite sides of the mold core.

In a further embodiment, at least one gas conduit of the gas conduit system has a bend of 90° or more.

In a further embodiment, at least one gas conduit at least partially extends under the mold core of the mold insert part.

In a further embodiment, the two or more gas outlet ports are configured to direct gas towards a centerline of the mold core.

In a further embodiment, each of the two or more gas outlet ports are configured to direct the gas in an angle relative to a plane defined by the first surface, where the angle is larger than 0° and smaller than 90°.

All the gas outlet ports may have the same angle relative to the plane. In other embodiments, each gas outlet port may be formed at angles relative to the plane, which are different from the other gas outlet ports.

In some embodiment, the angle of each gas outlet port is configured to blow gas onto a desired area of the free outer surface of the injection molded item, and predetermined dependent on the shape of the injection molded item.

In any of the previously mentioned embodiment, or any other embodiment mentioned in this application, the mold insert part may be formed in an additive manufacturing process.

When mold plates/mold insert parts are formed in steal—as is conventional—it is very difficult to form anything other than linear channels. When the mold insert part according to the disclosure is formed in an additive manufacturing process, such as 3D printing, and in a polymer material, e.g. a plastic, it is relatively easy to produce a mold insert part with complexly shaped gas conduits.

Further, the objects of the disclosure may be achieved in a second aspect, by a mold box for and injection molding machine, where the mold box comprises a first mold part; and
a second mold part,
where a mold insert part according to any one of the embodiments of the first aspect of the disclosure is insertable into one of the first or second mold part, and where a second mold insert having a mold cavity corresponding to the mold core in order to form an injection molded item is insertable into the other one of the first or second mold part to form a mold.

Further, the objects of the disclosure may be achieved in a third aspect, by an injection molding machine comprising a mold box according to the second aspect of the disclosure.

It should be emphasized that the term "comprises/comprising/comprised of" when used in this specification is taken to specify the presence of stated features, integers, steps or components but does not preclude the presence or addition of one or more other features, integers, steps, components or groups thereof.

BRIEF DESCRIPTION OF THE DRAWINGS

In the following, the disclosure will be described in greater detail with reference to embodiments shown by the enclosed figures. It should be emphasized that the embodiments shown are used for example purposes only and should not be used to limit the scope of the disclosure.

DETAILED DESCRIPTION

Figure 1:
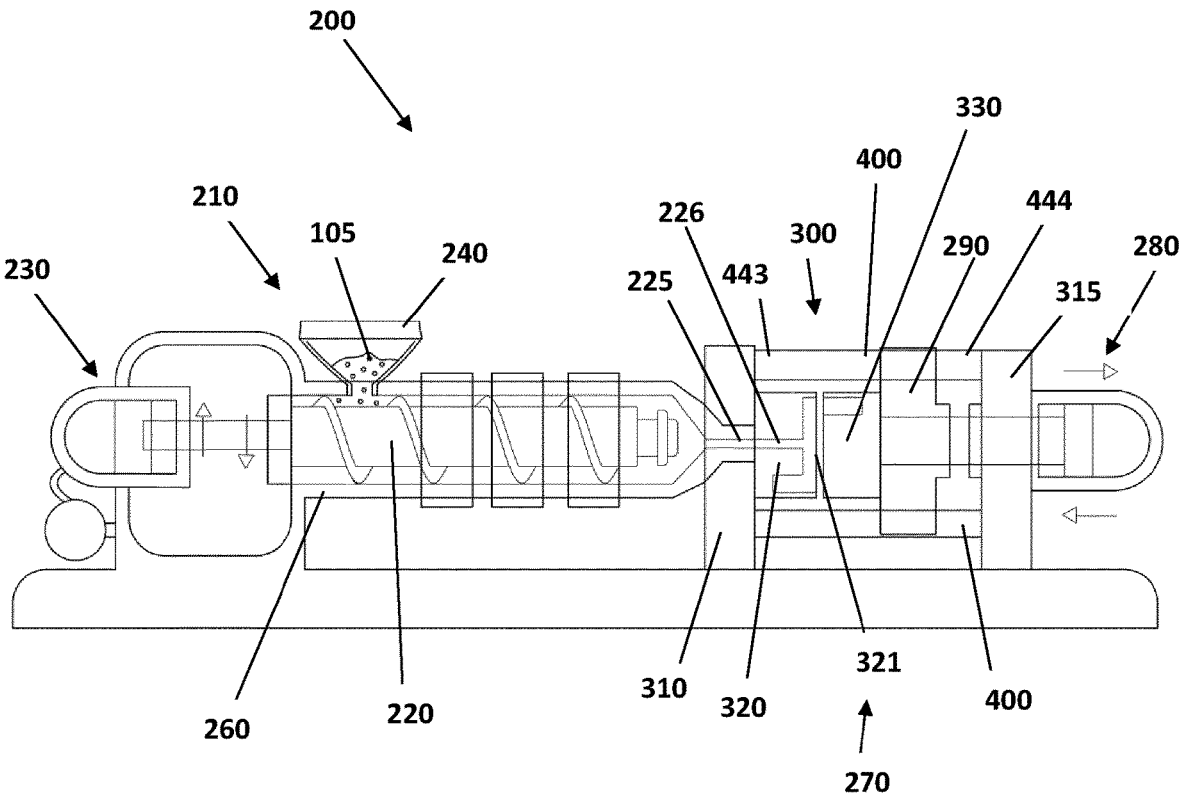
FIG. 1 schematically shows an outline of a prior art injection molding machine.

FIG. 1 illustrates schematically an injection molding machine 200 as known in the art. The injection molding machine 200 generally comprises an injection unit 210, shown in the left side of the figure, and a clamping unit 270, shown in the right side of the figure. The injection unit 210 handles injection of plastic material into a mold formed in the clamping unit 270 of the injection molding machine 200. The injection unit 210 and the clamping unit 270 of the injection molding machine 200 are attachable to a mount 201.

Injection molding machines 200 generally works in the following way: Plastic granules 105 are fed into the barrel 260 of a reciprocating screw 220 of the injection unit 210 via a hopper 240. The reciprocating screw 220 is driven by a drive mechanism 230, such as an electrical motor. The plastic granules 105 fed through the hopper 240 are then transported towards the clamping unit 270 by the reciprocal screw, while being compacted and they are heated by heating devices 250 surrounding the reciprocating screw 220, until they melt and reach a suitable viscosity at a nozzle 225 at the entrance to the clamping unit 270 with the mold. The mold is formed in a mold box 300.

The fluid plastic material is fed from the nozzle 225 through sprue channels 226 in a base plate 310 of the mold box 300, and reaches a mold cavity 321 formed in a first mold plate 320 of the mold box 300. The first mold plate 320 of the mold box 300 is connected to the base plate 310. The base plate 310 is connected to the mount 201. A second mold plate 330 which may comprise a mold core and/or further portions of a mold cavity is arranged moveably relative to the first mold plate 320, such that the mold box may be completely closed (clamped together) to allow injection of the melted plastic, and such that the mold box 300 may be opened to extract a molded item 60 (see FIG. 7).

In FIG. 1, the second mold plate 330 is attached to a moveable platen 290. The moveable platen 290—and thereby the second mold plate 330—is slideably arranged on a set of cylindrical main guide rail pillars 400. Typically, the clamping unit 270 of injection molding machines 200 comprises four cylindrical main guide rail pillars 400 for guiding the movement of the moveable platen 290 with the second mold plate 330. The movement of the moveable platen 290 with the second mold plate 330 is performed by a linear drive mechanism 280, typically a hydraulic mechanism.

Each of the main guide rail pillars 400 of the main guide rail system of the mold box 300 of the clamping unit 270 has an elongate body, which is cylindrical, and has a first end 443 and a second end 444. The first end 443 is fixed to the base plate 310, which is fixed to a frame (not shown) of the clamping unit 270. The frame of the clamping unit 270 may form part of the frame 201 of the injection molding machine 200, or may be fixed thereto.

The opposite end, the second end 444, of the elongate body of each main guide rail pillars 400 is fixedly connected to a second end structure 315 of the clamping unit 270. The second end structure 315 of the clamping unit 270 is fixed to the mount 201 of the clamping unit 270.

The second end structure 315 may also, as shown in FIG. 1, form a mount for the linear drive mechanism 280.

Now, returning to the moveable platen 290 with the second mold plate 330, this moveable platen 290 comprises through-going bearings e.g. slide bearings or ball bearings, slidably receiving the cylindrical main guide rail pillars 400.

In an injection process, the linear drive mechanism 280 clamps the first mold plate 320 and the second mold plate 330 together, whereupon plastic is injected by the reciprocal screw 220 through the nozzle 225 and into the mold cavity 321. When the plastic has filled the mold cavity 321 completely, and has cooled sufficiently for the plastic to be in solid state, then the linear drive mechanism 280 moves the second mold plate 330 away from the first mold plate 320, and the molded item 60 is ejected from the mold. The ejection of the molded item 60 is typically done by ejector pins (not shown) formed in/through the base plate 310.

After the injection of plastic into the mold and when the mold plates 320, 330 have been separated from each other it is often desirable to further cool the injection molded item 60 further before removing the injected molded item 60 from the mold.

It is known in the art to cool the injection molded item 60 by blowing a gas such as air onto the injection molded item 60 when it is still located on a mold core 20 of one of the mold plates 320, 330 after the mold plates have been separated.

Often the mold including the mold core and the corresponding mold cavity are arranged on mold insert. Mold inserts a generally plate shaped structures which are attachable to the mold plates 320, 330 by inserting them there into. Thereby, it is obtained that the often very heavy mold plates do not need to be replaced every time a new type of item is to be injection molded. Instead only the mold inserts are exchanged.

In one aspect, the present disclosure relates to such a mold insert part 1. The mold insert part 1 is described in connection with FIGS. 2-8 below. It will be appreciated that the mold insert part 1 described may be used in a mold box 300 as outlined above, in connection with FIG. 1 above. It will further be appreciated that such a mold box may be implemented in an injection molding machine 200 as outlined above, in connection with FIG. 1 above.

It will also be appreciated, that although the features for cooling an injection molded item 60 are described in connection with a mold insert part 1 in the embodiments show in FIGS. 2-8, the same features may in principle be implemented in mold plates as such, i.e. in mold boxes not having replaceable mold inserts.

Figure 2:
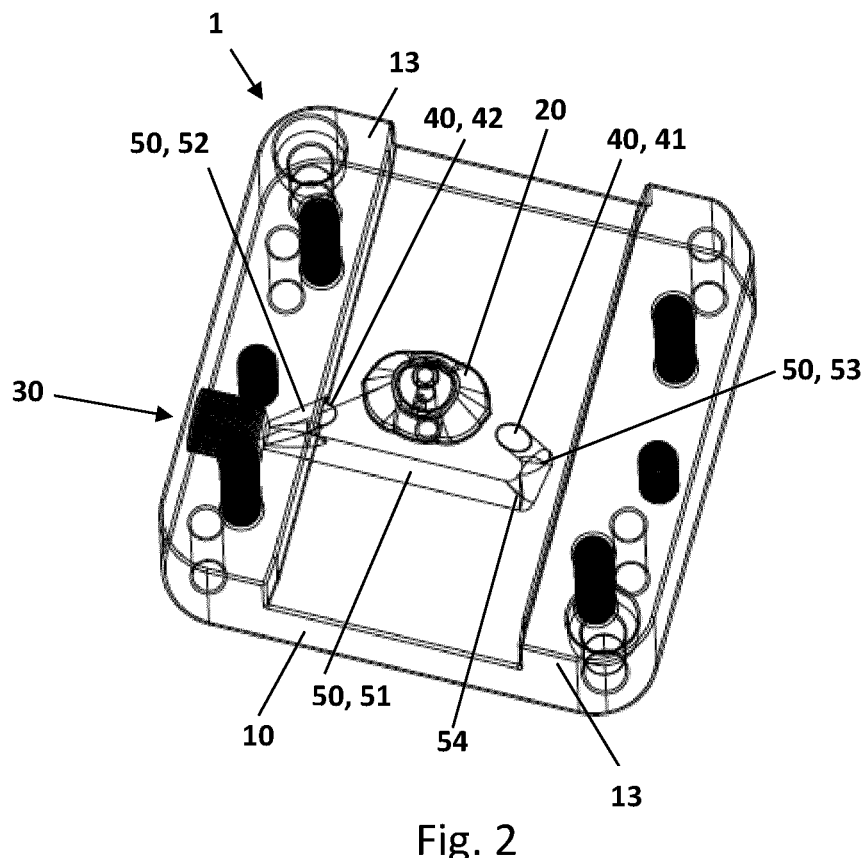
FIG. 2, in a transparent elevated perspective view, shows a mold insert part with a mold core, and according to the disclosure, from one angle.
Figure 3:
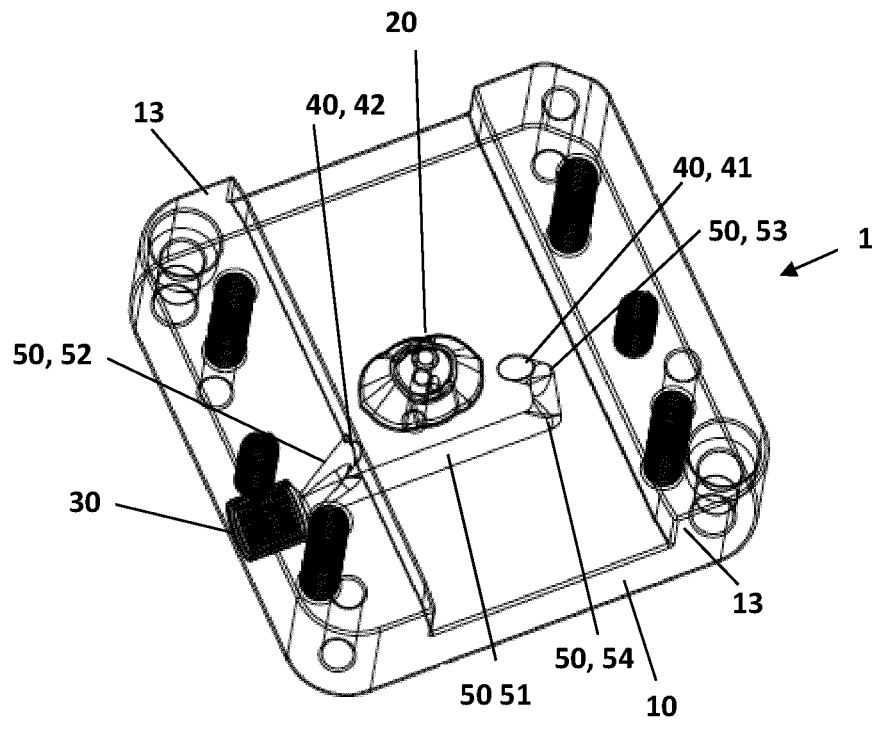
FIG. 3 shows mold insert part of FIG. 2 from a different angle.

Now turning to FIGS. 2-8, FIGS. 2 and 3 are transparent elevated perspective views, of an embodiment of the mold insert part 1 according to the disclosure. FIG. 2 shows the mold insert from one angle. FIG. 3 shows the mold insert part 1 from a different angle.

The mold insert part 1 comprises a main body 10, which is a generally plate shaped structure having a first surface 11, and, opposed thereto, a second surface 12.

Figure 4:
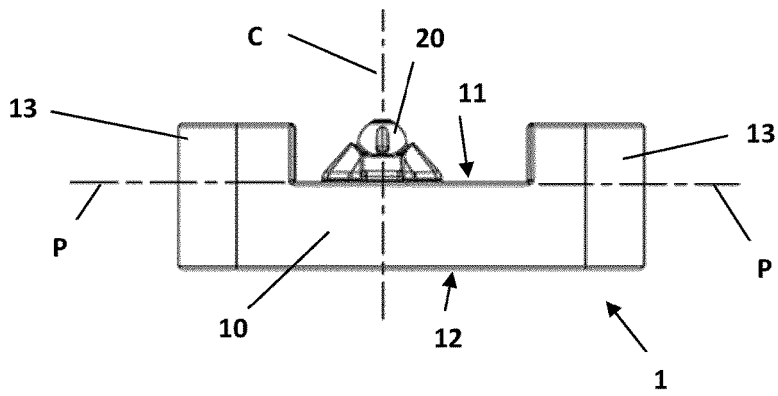
FIG. 4 shows the mold insert part of FIG. 2 in a side view.

The first surface 11 defines a plane P, see FIG. 4. FIG. 4 shows the mold insert part 1 of FIG. 2 in a side view, where also the first surface 11 and the opposite second surface 12 is visible. The first surface 11 faces a second mold insert part with a mold cavity when both are inserted in/attached to mold plates of a mold box, e.g. as described above.

The mold insert part 1 comprises a mold core 20 extending outwardly from said first surface 11 of the main body 10. This means that the mold core 20 extends above the plane P.

The mold insert part 1 is configured for cooperating with a second mold insert part (not shown) having a mold cavity, which is configured for—together with the mold insert part 1 with the mold core 20—forming a mold for injection molding an injection molded item 60.

The mold insert part 1 is insertable into a mold plate of a mold box, e.g. as exemplified above. The second mold insert part with the mold cavity likewise is insertable into another mold plate of a mold box, e.g. as exemplified above.

The main body 10 of the mold insert part 1 may—as shown—be rectangular or quadratic in shape.

The main body 10 of the mold insert part 1—at least in the shown embodiment—further comprises side flanges 13. The side flanges 13 are optional. The side flanges 13 extend above the first surface 11 of the main body 10 of the mold insert part 1. This means that the side flanges 13 extend above the plane P. The side flanges 13 are configured for cooperating with recesses (not shown) on the cooperating second mold insert part (not shown). In the embodiment shown in the FIGS. 2-8 there are two side flanges 13.

The mold insert part 1 further comprises a gas inlet port 30. The gas inlet port 30 is connectable to a supply of pressurized gas (not shown).

The pressurized gas may be air. The air may be pressurized by a pump (not shown). Alternatively, the supply of pressurized gas may be a replaceable pressurized container (not shown).

The supply of pressurized gas may form part of an injection molding machine 200, e.g. as described above.

The supply of pressurized gas may be connected to the gas inlet port 30 by suitable connection tubing configured for conducting pressurized gas and/or conduits formed in the mold plate(s) or other parts of the injection molding machine 200.

The gas inlet port 30 is connected to gas outlet ports 40 via a gas conduit system 50.

It will be appreciated that a mold insert part 1 according to the disclosure may comprise more than the gas outlet ports 41, 42 shown in FIGS. 2-8, such as 3-20 gas outlet ports 40.

Each of the two or more gas outlet ports 41, 42 are arranged at least partially through the first surface 11.

In FIGS. 2-8, a first gas outlet port 41 is arranged fully in and through first surface 11 of the main body 10, and a second gas outlet port 42 is arranged in an intersection between the first surface 11 of the main body 10, and one of the side flanges 13. In the embodiment, shown in FIGS. 9A-C, all of the total of seven outlet ports 40 are arranged fully in and through first surface 11 of the main body 10. Thus, all of the gas outlet ports 40 in the FIG. 9A-C embodiment are of the type designated with the reference number 41 in the FIG. 2-8 embodiment.

In any case, the gas outlet ports 40, 41, 42 are arranged to direct a gas flow from the gas inlet port 30 (when the gas inlet port 30 is connected to the source of pressurized gas) and through the gas conduit system 50, towards an uncovered surface of an injection molded item 60 located on the mold core 20 in situations where the mold core 20 and the mold cavity have been separated from each other.

By uncovered surface in the context is meant that, when after the mold halves/plates have been moved away from each other, and the injection molded item 60 rests on the mold core 20, some of the surfaces of the injection molded item 60 are not covered by the opposite mold part any more, and are accessible. Other surfaces of the injection molded item 60 will be in contact with the mold core 20 or the first surface 11 of main body 10 of mold insert part 1, and these are covered.

Figures 5, 6:
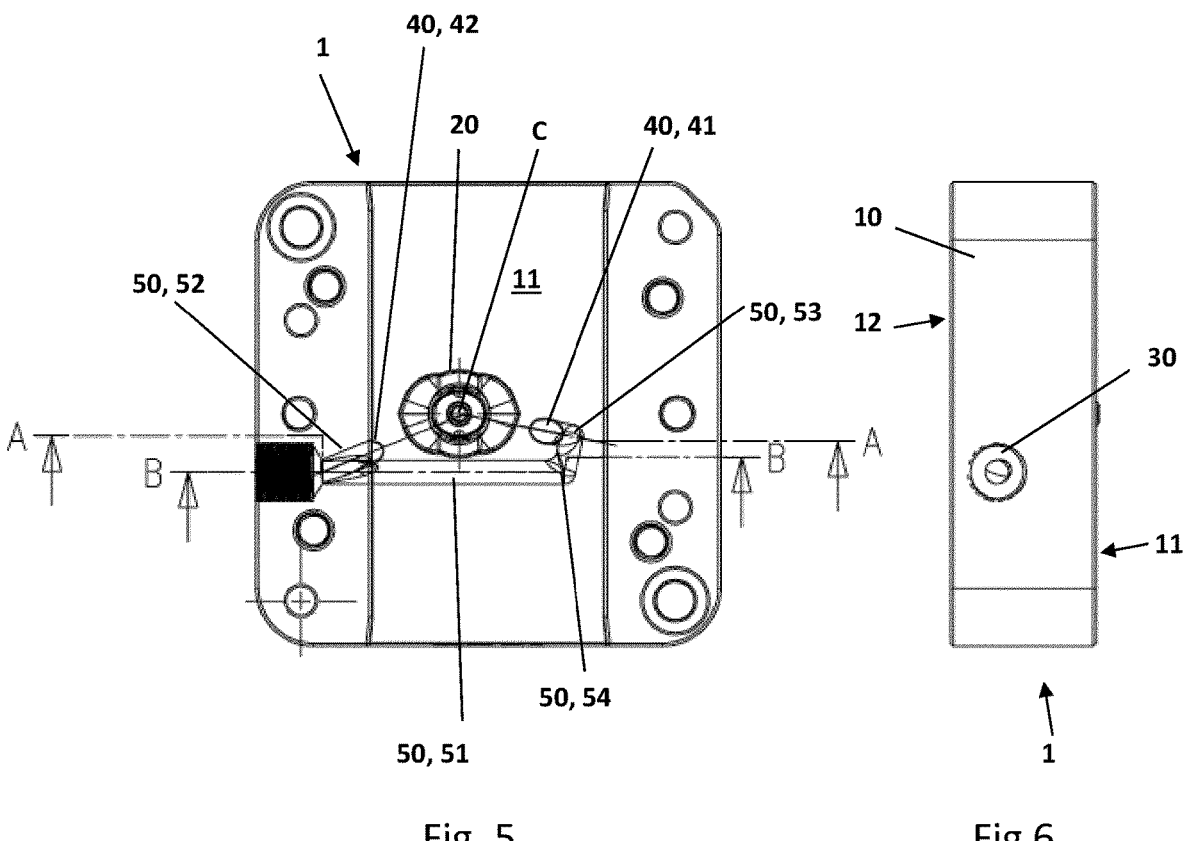
FIG. 5 shows the mold insert part of FIG. 2 in a top view, and indicating sections A-A and B-B through the mold insert part, the sections shown in FIG. 7.
FIG. 6 shows the mold insert part of FIG. 2 in another side view than FIG. 4.
Figures 7, 8:
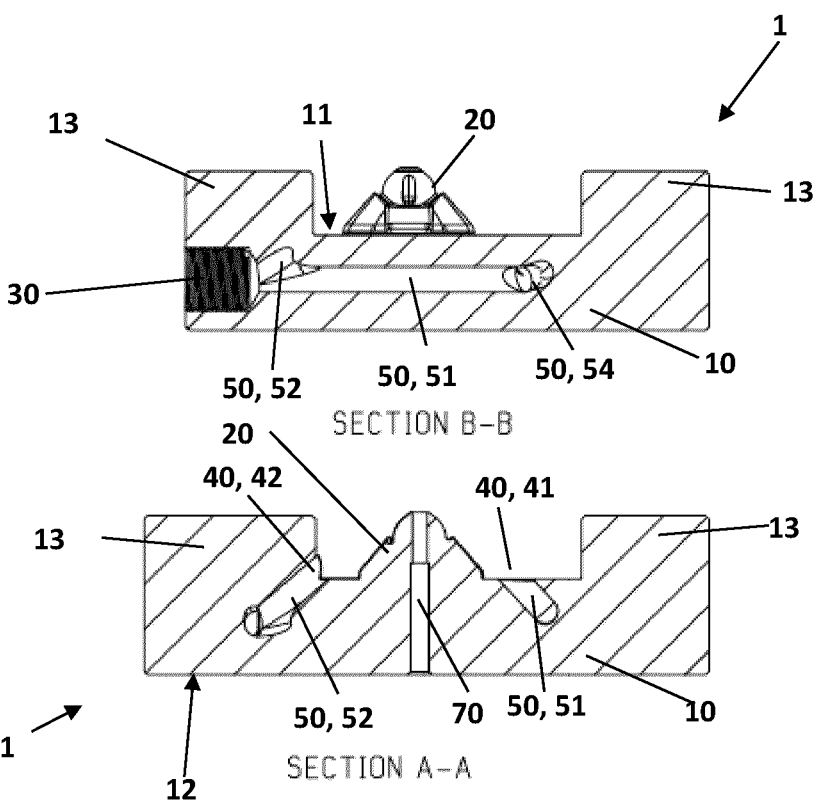
FIG. 7 shows cross sections A-A and B-B through the mold insert part of FIG. 5.
FIG. 8 show cross section A-A of FIG. 5 with an injection molded item located on the mold core.

FIG. 8, showing a section, section A-A, of FIG. 5, illustrates a situation, where the mold insert parts have been spaced apart after an item 60 has been injection molded in the mold formed by the mold insert part 1 with the mold core 20 and the other—not shown—mold insert part with the mold cavity. In FIG. 8, the injection molded item 60 is located on the mold core 20. The arrows 59 indicate a flow/stream of gas—for example atmospheric air being blown onto the free outer surfaces 61 of the injection molded item 60. By free surfaces, it is meant surfaces of the item 60 which are not facing the mold core 20 or the first surface 11 of the main body 10 of the mold insert part 1, i.e. the surfaces of the item 60, which have been exposed after the other mold insert part with the mold cavity has been moved away from the insert mold part 1 (with the mold core 20).

The gas conduit system 50 extends inside the main body 10 of the mold insert part 1, and connects the two or more gas outlet ports 40 with the gas inlet port 30.

Thus, the gas inlet port 30 is common to the two or more gas outlet ports.

In the embodiment, shown in FIGS. 2-8, the gas conduit system 50 comprises a first conduit 51 extending from the gas inlet port 30 to the first gas outlet port 41. The gas conduit system 50 further comprises a second conduit 52 extending from the gas inlet port 30 to the second gas outlet port 40. As shown, the first and second conduits 51, 52 branches of from each other in close vicinity of the gas inlet port 30. In other not shown embodiments, the gas conduit system 50 may comprise intermediate conduit sections and/or branching off of conduits at other locations.

Figure 9A:
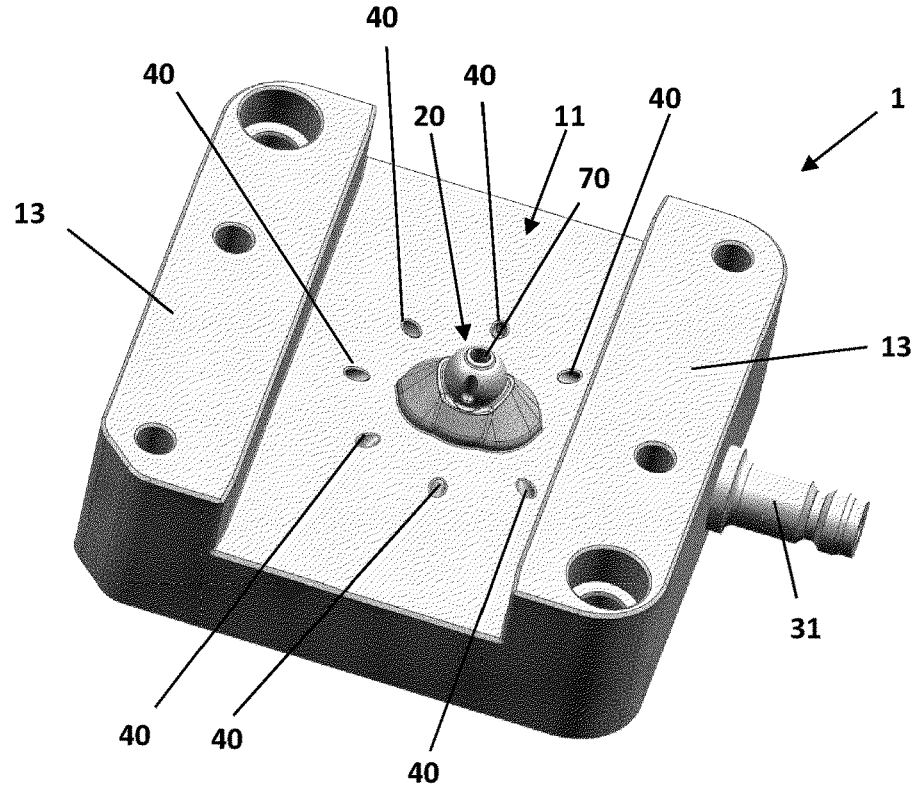
FIG. 9A, in an elevated perspective view, shows a mold insert part of another embodiment of the disclosure.
Figure 9B:
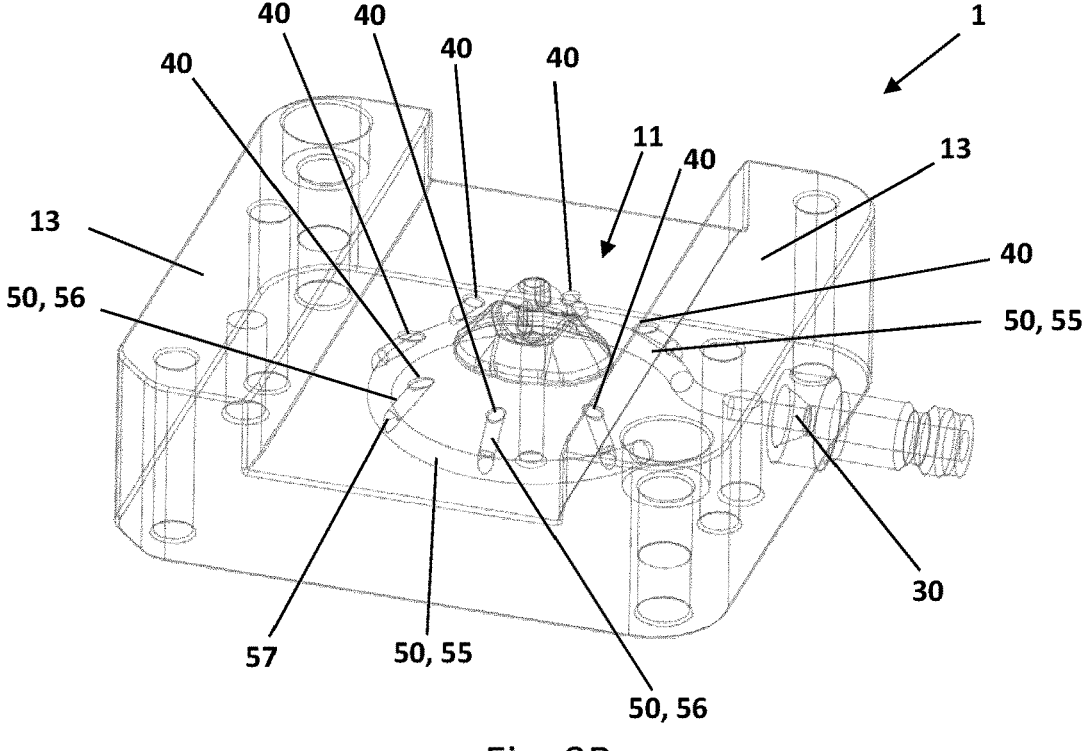
FIG. 9B shows the mold insert part insert part of FIG. 9A in a transparent view from one angle.
Figure 9C:
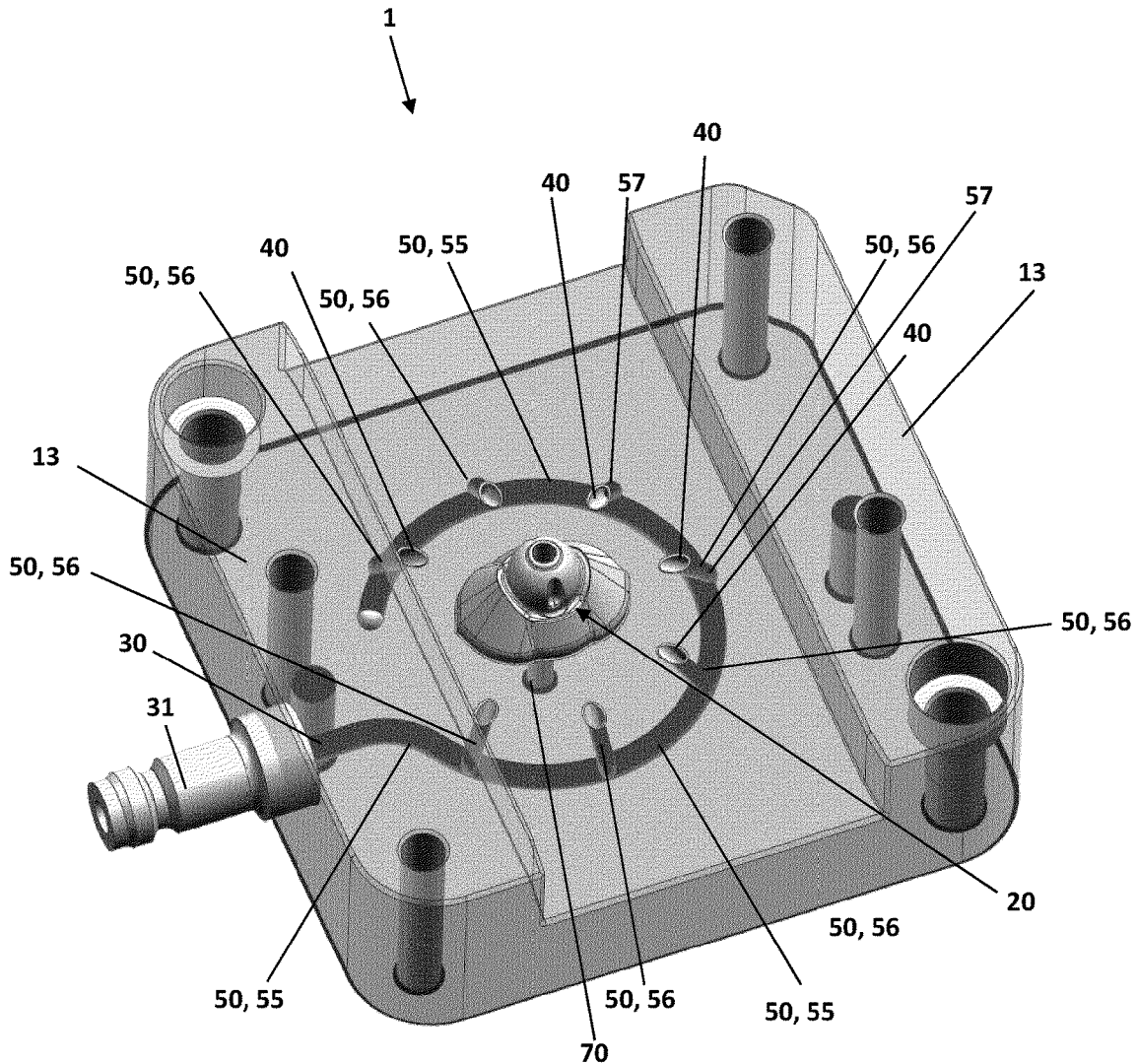
FIG. 9C shows the mold insert part insert part of FIG. 9A in a transparent view from another angle than in FIG. 9B.

As shown in FIG. 9B-C, in other embodiments, the gas conduit system 50 may comprises a common gas conduit 55, extending from the gas inlet port 30, and which branches into sub-conduits 56, which sub-conduits 56 connect to the gas outlet ports 40. In, the embodiment, shown in FIGS. 9A-C there are seven such sub-conduits 56.

In either case, as shown, the gas conduit system 50 is provided in below said first surface 11. This means that the gas conduit system 50 is provided below the plane P.

As shown, the gas inlet port 30 may also be provided below said first surface 11. This means that the gas inlet port 30 is provided below the plane P.

In the embodiments shown in FIGS. 2-8 and in FIGS. 9A-C respectively, the gas inlet port 30 is provided in and through a side wall of the main body 10 of the mold insertion part 1. In other, not shown embodiments the gas inlet port 30 may be provided in/through the second surface 12.

In the embodiment shown in FIGS. 2-8, the two gas outlet ports 41, 42 are arranged on opposite sides of the mold core 20. In the embodiment shown in FIGS. 9A-C, the seven gas outlet ports 40 completely surrounds/encircles the mold core 20. More generally, in embodiments where the mold insertion part 1 comprises more than two gas outlet ports 40, at least two of the two or more gas outlet ports 40 are arranged on opposite sides of the mold core 20.

As mentioned above, the mold insert part 1 may—in not shown embodiments—comprise more than the two gas outlet ports 41, 42 shown in FIGS. 2-8, such as 3-20 gas outlet ports 40. Preferably, the plurality of gas outlet ports 40 surrounds the mold core 20. In some embodiments the plurality of gas outlet ports 40 are equidistantly spaced apart. In further embodiments the plurality of gas outlet ports 40 are formed in a circle surrounding the mold core 20, as exemplified in the FIG. 9A-C embodiment. Alternatively, the plurality of gas outlet ports 40 may be formed at positions in the first surface 11, dependent on a shape of the item 60 to be injection molded, such that surfaces of the item 60 that are in particular need of cooling may be reached by the cooling gas from the outlet ports 40.

In embodiments, such as the FIG. 9A-C embodiment, where there are more than two gas outlet ports 40, all of the gas outlet ports 40 may be of the type designated with the reference number 41 in the FIG. 2-8 embodiment, i.e. where a first gas outlet port 41 is arranged fully in and through first surface 11 of the main body 10.

However, in other—not shown embodiments, where there are more than two gas outlet ports 40, some or all of the gas outlet ports 40 may be of the type designated with the reference number 42 in connection with the FIG. 2-8 embodiment, i.e. where a second gas outlet port 42 is arranged in an intersection between the first surface 11 of the main body 10, and one of the side flanges 13

As the plurality of gas outlet ports 40 are connected to one common gas inlet 30, preferably provided at a side wall of the main body 10 of the mold insert part 1, and the since the plurality of gas outlet ports 40 are arranged to surround the mold core 20, at least some of the conduits of the gas conduit system 50 need to stretch first in one direction, and then in the opposite direction. In one embodiment, a gas conduit 51 of the gas conduit system 50 comprises a bend 53, of 90° or more. In further embodiments, a gas conduit 51 of the gas conduit system 50 comprises a bend 53, of 180° formed in the first conduit 51. In the embodiment shown in FIGS. 1-8, a bend 53 of 90° is visible in FIG. 5. The bend 53 is formed at least in a plane parallel to the plane P defined by the first surface 11. As also shown in FIG. 5, a second bend 54 is also formed in the first conduit 51, which is less than, but very close to 90°.

As is also visible in FIG. 5 some gas conduits 50, in FIG. 5 the first gas conduit 51 is formed such that it at least partially extends under the mold core 20 of the mold insert part 1. As shown in the section A-A in FIG. 7, the mold insert part 1 may further comprise an injection channel 70 for injecting molten plastic into the mold. The injection channel 70 is arranged centrally through the mold core 20. In other—not shown embodiments—and depending also on the shape and size of the item 60 to be injection molded, an injection channel 70 may be arranged at other positions relative to the mold core, and in some cases, there may be more than one injection channel 70 (not shown). The gas conduits of the gas conduit system 50 necessarily must avoid such structures such as the injection channel 70 and for example passageways for ejector pins and the like. However, it has been realized that some gas conduits 50 may extend very close to and even under the core to save space in the mold insert part 1.

As illustrated in FIG. 4, the mold core 20 may comprise a centerline C.

In some embodiments, two or more gas outlet ports 40, 41, 42 are further configured to direct gas towards the centerline C of the core 20. As shown in FIG. 5 this is the case with the FIGS. 2-8 embodiment. It is also the case in the FIG. 9A-C embodiment.

Now referring again to FIG. 8, the two gas outlet ports 41, 42 are configured to direct the gas in an angle relative to a plane P defined by the first surface 11. As shown this angle may be an obtuse angle. In general, the angle is larger than 0° and smaller than 90°.

The angle of each gas outlet port 40 is preferably configured to blow gas onto a desired area of the free outer surface 61 of the injection molded item, and predetermined dependent on the shape of the injection molded item 60.

All of the gas outlet ports 40 may have the same angle relative to the plane P. In other embodiments, each gas outlet port 40 may be formed at angles relative to the plane, which are different from the other gas outlet ports 40.

As also mentioned above, the mold insert part 1 in the embodiment shown in FIGS. 9A-C generally has the same features as the mold insert part 1 in the embodiment shown in FIGS. 2-8, the difference being the arrangement of the gas conduit system 50 and the gas outlet ports 40. The same reference numbers are used for like parts.

In the embodiment shown in FIGS. 9A-C, the gas inlet port 30 shown with a connection stud 31. It will be appreciated that also the embodiment of FIGS. 2-8 may be equipped with such a connection stud.

The connection stud may be a separate part assembled to the mold insert part or it may be formed integral therewith.

In the embodiment shown in FIGS. 9A-C seven gas outlet ports 40 are arranged in and through the first surface 11 of the main body 10 of mold insert part 1. The gas outlet ports 40 are arranged to encircle (surround) the mold core 20. The gas outlet ports 40 are connected to the gas inlet 30 via a main gas conduit 55, which branches of into sub-conduits 56, each of which connect a gas outlet port 40 with the main gas conduit 55. Where the sub-conduits 56 branches of from the main gas conduit 55 a bend 57 between the main gas conduit 55 and the sub-conduit 56 is provided, which is 90° (seen perpendicular to the plane P).

In any of the above described embodiment, at least the mold insert part 1 may be formed in an additive manufacturing process. In further embodiments thereof, both the mold insert parts, or even the mold plates of a mold box may be formed in an additive manufacturing process.

In mold plates/mold inserts formed in steal—as is conventional—it is very difficult to form anything other than linear channels. When instead the mold insert part 1 according to the disclosure is formed in an additive manufacturing process, such as 3D printing, and in a polymer material, e.g. a plastic, it is easier to shape complexly shaped gas conduits.

Figure 10A:
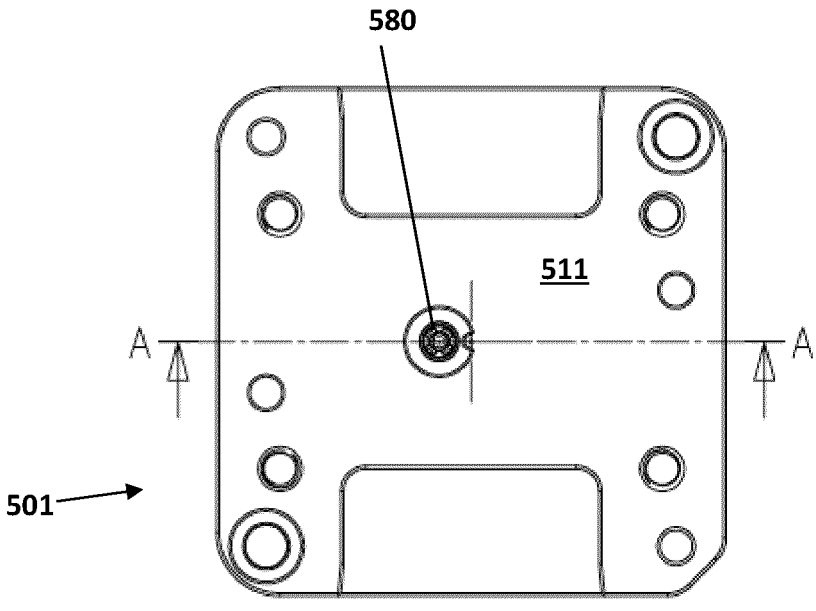
FIG. 10A, in a top view, shows another mold insert part with a mold cavity and a vent conduit, and indicating a section A-A through the mold insert.
Figure 10B:
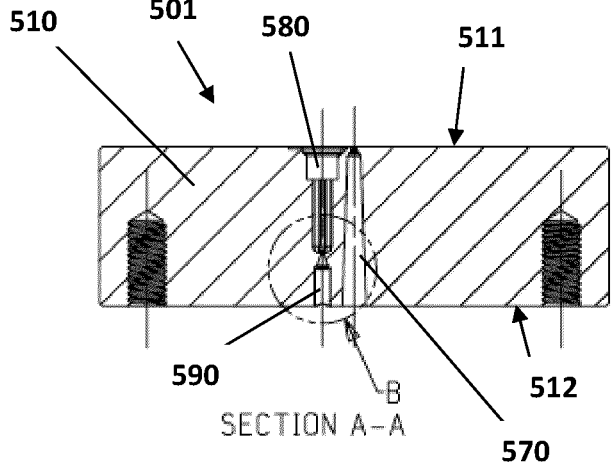
FIG. 10B shows section A-A through the mold insert part with a mold cavity of FIG. 10A.
Figure 10C:
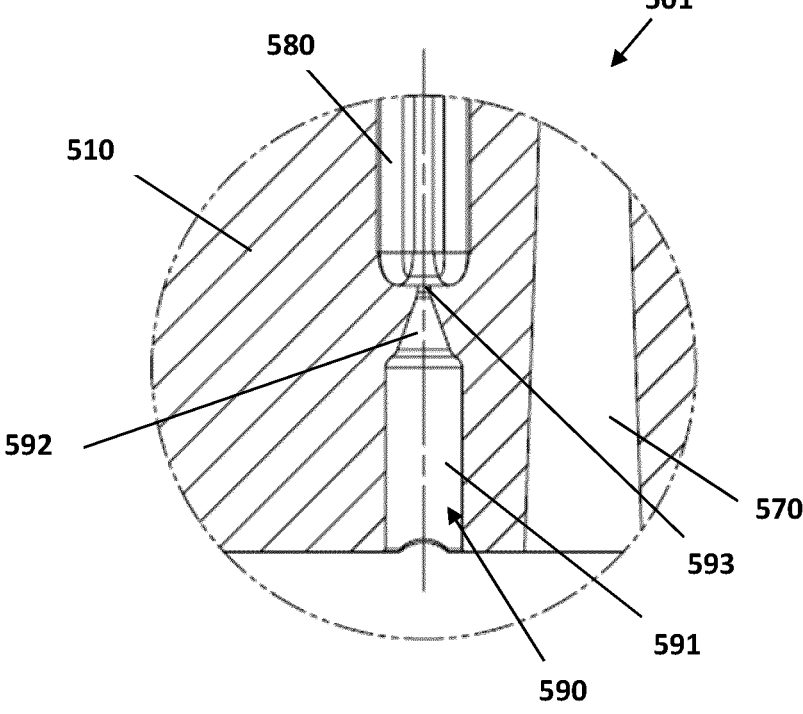
FIG. 10C shows an enlarged view of detail B in FIG. 10B.

Turning now to FIGS. 10A-C, these figures illustrates a mold insert part 501 having means for venting the mold during the injection molding process. As also described above, the mold insert parts or even the mold plates of mold boxes may be formed in a in an additive manufacturing process, such as 3D printing, and in a polymer material, e.g. a plastic.

In such cases, when the mold plates/mold insert parts are clamped together for injecting the molten plastic into the mold, it has shown that the polymer material makes the mold plates/mold insert parts more air tight, than is the case with mold plates/mold insert parts formed in e.g. steel. This increases the need for venting the mold. Before injecting the molten plastic into the mold (mold cavity), the mold is filled with atmospheric air. When the molten plastic enters the mold cavity, this air must efficiently be vented from the mold cavity in order to make space for the molten plastic, and to ensure even distribution of molten plastic and to prevent air bubbles in the finished injection molten item 60.

A mold insert part according to a fourth aspect of the disclosure alleviates or eliminates these problems.

FIG. 10A shows a mold insertion part 501 according to the fourth aspect.

The mold insertion part 501 in FIG. 10A is illustrated as a mold insertion part 501 with a mold cavity 580. The mold cavity 580 shown is as such unrelated to the mold core 20 shown in connection with FIGS. 2-9. However, the mold insert part 501 is configured for cooperating with a mold insertion part with a mold core (not shown), where the mold core is configured to cooperate with the mold cavity to form an injection molded item (not shown). In FIG. 10A, the mold cavity 580 has an elongate cylindrical shape configured to form an elongate cylindrical item.

The mold insert part 501 comprises a main body 510, which is a generally plate shaped structure having a first surface 511, and, opposed thereto, a second surface 512.

The first surface 511 defines a plane P2. The first surface 511 is configured for facing a second mold insert part with a mold core (not shown), when both are inserted in/attached to mold plates of a mold box, e.g. as described above.

The mold insert part 501 comprises a mold core cavity 580 extending inwardly from said first surface 511 of the main body 510. This means that the mold core 20 extends below the plane P2.

The mold insert part 501 is configured for cooperating with a second mold insert part (not shown) having a mold core, which is configured for—together with the mold insert part 501 with the mold cavity 580—forming a mold for injection molding an injection molded item (not shown).

The mold insert part 501 is insertable into a mold plate of a mold box, e.g. as exemplified above. The second mold insert part with the mold core likewise is insertable into another mold plate of a mold box, e.g. as exemplified above.

The main body 510 of the mold insert part 501 may—as shown—be rectangular or quadratic in shape.

The mold insert part 501 may be configured to cooperate with a mold insert part 1 (having a mold core 20) as described above, but where the mold core and the mold cavity of the respective mold insert parts are adapted to cooperate. In other embodiment the mold insert part 501 may be configured for cooperating with a more conventional type of mold insert part with a core.

FIG. 10B shows a section A-A through the mold insert part 501 as indicated in FIG. 10A. The side sectional view in FIG. 10B reveals that the mold insert part 501 comprises an injection channel 570 for injecting molten plastic into the mold. The injection channel 570 is arranged centrally through the mold insert part 501 and may interface with further channels/runners of cavity portions in the cooperating mold insert part to fill the mold cavity 580.

FIG. 10C shows the detail B indicated by circle in FIG. 10B. In FIG. 10B it is shown that a venting conduit 590 is formed extending from an extreme end of the mold cavity 580.

The venting conduit 590 forms an air vents configured for allowing air to escape from the mold cavity 580 as the mold cavity 580 is filled with melted material.

In steel mold plates/mold insert parts, it is very difficult to form other than linear channels. The mold insert part 501 according to the disclosure is 3D printed in plastic. Thereby, it is easier to shape complexly formed air vents 590.

In the shown example, the venting conduit 590 has a generally cylindrical main portion 591. Where the venting conduit main portion 591 approaches the mold cavity 580, a conical portion 592 of the venting conduit 590 is provided such that a restriction hole 593 is provided between the mold cavity 580 and the venting conduit 590.

The restriction hole is so small that it prevents molten plastic to exit the mold cavity 580, while still allowing the air otherwise trapped in the mold cavity 580 to escape.

It is to be noted that the figures and the above description have shown the example embodiments in a simple and schematic manner. Many of the specific mechanical details have not been shown since the person skilled in the art should be familiar with these details and they would just unnecessarily complicate this description. For example, the specific materials used and the specific injection molding procedure have not been described in detail since it is maintained that the person skilled in the art would be able to find suitable materials and suitable processes to manufacture the container according to the current disclosure.

PARTS LIST

1 mold insert part
10 main body of mold insert part
11 first surface of main body of mold insert part
12 second surface of main body of mold insert part
13 side flanges
20 mold core
30 gas inlet port
40 gas outlet port
41 (first) gas outlet port/first type gas outlet port
42 (second) gas outlet port second type gas outlet port
50 gas conduit system
51 gas conduit
52 gas conduit
53 bend in a gas conduit
54 bend in a gas conduit
55 gas conduit
56 sub-conduits/sub gas conduits
59 gas flow, arrow indicating a gas flow
60 injection molded item
61 uncovered/free outer surfaces of the injection molded item
70 injection channel for injecting molten plastic into the mold
105 plastic granules
200 injection molding machine
201 mount for the injection molding machine
210 injection unit of the injection molding machine
220 reciprocating screw of the injection unit 225 nozzle
226 sprue channels
230 drive mechanism of the injection molding machine
240 hopper
250 heating devices
260 barrel of the injection unit of the injection molding
  machine
270 clamping unit 270 of the injection molding machine
280 linear drive mechanism
290 moveable platen
300 mold box
310 base plate of the mold box
315 second end structure
320 first mold plate
321 mold cavity
330 second mold plate
400 main guide rail pillar
443 first end of main guide rail pillar
444 second end of main guide rail pillar
501 mold insert part
510 main body of the mold insert part
511 first surface of the main body of the mold insert part
512 second surface of the main body of the mold insert
  part
570 injection channel for injecting molten plastic into the
  mold
580 mold cavity
590 venting conduit
591 main portion of the injection channel
592 conical portion of the injection channel
593 restriction hole of the injection channel
C centerline
P plane defined by first surface of main body of mold
  insert part The ivention claimed is:

1. A mold insert part for injection molding, comprising:
a main body having a first surface and an opposed second
  surface, the first surface defining a plane;
a mold core extending from the first surface of the main
  body of the mold insert part;
a gas inlet port connectable to a supply of pressurized gas;
two or more gas outlet ports formed in and through the
  first surface of the main body and arranged around the
  mold core, at least two of the gas outlet ports being
  positioned on opposite sides of the mold core, each gas
  outlet port being oriented at an angle relative to the
  plane to direct gas toward a centerline of the mold core
  and toward an uncovered surface of an injection
  molded item located on the mold core after the mold
  core and the mold cavity are separated from each other;
  and
a gas conduit system extending inside the main body
  below the first surface and connecting the gas inlet port
  with the two or more gas outlet ports, wherein the gas
  conduit system comprises a circumferential conduit
  portion extending around the mold core and a plurality
  of sub-conduits branching from the circumferential
  conduit portion, each sub-conduit fluidly connecting
  the circumferential conduit portion with a respective
  one of the gas outlet ports.

2. The mold insert part according to claim 1, wherein at
least two of the two or more gas outlet ports are circumfer-
entially distributed in a closed loop around the mold core.

3. The mold insert part according to claim 1, wherein the
at least one conduit extends beneath a central region of the
mold core and is routed around an injection channel extend-
ing centrally through the mold core.

4. The mold insert part according to claim 1, wherein the
gas outlet ports are arranged at non-uniform angular orien-
tations relative to the plane such that each gas outlet port
directs gas toward a distinct region of the uncovered surface
of the injection molded item.

5. The mold insert part according to claim 1, wherein each
gas outlet port is oriented at an angle relative to the plane
defined by the first surface, the angle being greater than 0°
and less than 90°, such that the gas flow is directed both
upwardly from the first surface and inwardly toward the
mold core.

6. The mold insert part according to claim 1, wherein the
gas conduit system includes at least one conduit having a
bend of at least 90° formed in a plane parallel to the plane
defined by the first surface.

7. The mold insert part according to claim 1, wherein all
of the gas outlet ports are formed entirely within the first
surface of the main body such that no portion of the gas
outlet ports is disposed in a structure extending above the
first surface.

8. A mold insert comprising:
a housing defining a mold surface and an opposing
  support surface, the housing further defining at least
  one sidewall connecting the mold surface and the
  support surface;
a mold core positioned on the mold surface;
a gas inlet port defined by the at least one sidewall;
one or more gas outlet ports formed in and through the
  mold surface of the housing and arranged around the
  mold core, each gas outlet port being configured to
  direct a gas flow at an angle relative to the mold surface
  toward a centerline of the mold core; and
a gas conduit system extending within the housing below the
  mold surface and configured to transport gas from the gas
  inlet port to the one or more gas outlet ports,
wherein the gas conduit system comprises a circumferential
conduit portion extending around the mold core and a
plurality of sub-conduits branching from the circumferential
conduit portion, each sub-conduit fluidly connecting the
circumferential conduit portion with a respective one of the
gas outlet ports.

9. The mold insert of claim 8, wherein the one or more gas
outlet ports comprise a plurality of gas outlet ports circum-
ferentially distributed around the mold core such that the
mold core is at least partially surrounded by the gas outlet
ports.

10. A mold insert comprising:
a housing defining a mold surface;
a mold core positioned on the mold surface and config-
  ured to receive molding material from an injection
  channel defined by the housing; and
a gas delivery system comprising a gas inlet, a gas
  distribution manifold disposed within the housing, and
  one or more gas outlets defined at the mold surface, the
  gas distribution manifold being fluidly connected to the
  gas inlet and configured to distribute gas from the gas
  inlet to the one or more gas outlets,
wherein:
the gas distribution manifold extends within the housing in
a path that is laterally offset from and extending at least
partially around the injection channel such that gas is
delivered to multiple regions of the mold surface adjacent
the mold core after separation of a corresponding mold
cavity, and
the gas distribution manifold comprises a circumferential
conduit portion extending around the mold core and a
plurality of sub-conduits branching from the circumferential conduit portion, each sub-conduit fluidly connecting the circumferential conduit portion with a respective one of the gas outlets.

11. The mold insert of claim 10, wherein the circumferential conduit portion forms a closed loop surrounding the mold core.

12. The mold insert of claim 10, wherein the gas delivery system comprises a plurality of gas outlet ports distributed around the mold core and fluidly connected to the gas distribution manifold such that gas is delivered to the gas outlet ports from multiple circumferential locations within the housing.

13. The mold insert part according to claim 1, wherein:

the two or more gas outlet ports comprise seven gas outlet ports formed in and through the first surface of the main body, the seven gas outlet ports being circumferentially spaced in a circular arrangement around the mold core, and the gas conduit system comprises a main gas conduit extending from the gas inlet port and a plurality of sub-conduits branching from the main gas conduit to respective ones of the seven gas outlet ports, each sub-conduit meeting the main gas conduit at a bend of 90 degrees in a direction perpendicular to the plane defined by the first surface.

14. The mold insert of claim 8, wherein:

the housing further comprises two side flanges extending above the mold surface, the gas outlet ports comprise a first gas outlet port arranged fully in and through the mold surface and a second gas outlet port arranged at an intersection between the mold surface and one of the side flanges, the first gas outlet port and the second gas outlet port being positioned on opposite sides of the mold core, and the gas conduit system comprises a first conduit extending from the gas inlet port to the first gas outlet port and a second conduit extending from the gas inlet port to the second gas outlet port, the first conduit and the second conduit branching from one another in close vicinity of the gas inlet port.

15. The mold insert of claim 10, wherein:

the gas inlet is provided in and through a sidewall of the housing and includes a connection stud, the gas distribution manifold comprises a main gas conduit extending within the housing below the mold surface and a plurality of sub-conduits branching from the main gas conduit to respective gas outlets defined at the mold surface, the gas outlets comprise seven gas outlets arranged in a circular pattern around the mold core, and each sub-conduit joins the main gas conduit at a bend of about 90 degrees, measured in a direction perpendicular to the mold surface.

\* \* \* \* \*